United States Patent

[11] 3,612,478

[72] Inventor George A. Blazek
 Hinsdale, Ill.
[21] Appl. No. 39,987
[22] Filed May 25, 1970
[45] Patented Oct. 12, 1971
[73] Assignee Advance Valve Installations, Inc.
 Hinsdale, Ill.

[54] VALVE
 7 Claims, 3 Drawing Figs.
[52] U.S. Cl. .................................................. 251/145,
  251/171, 251/189
[51] Int. Cl. ...................................................... F16k 3/22
[50] Field of Search .......................................... 251/143,
  145, 146, 171, 189

[56] References Cited
 UNITED STATES PATENTS
1,074,762 10/1913 Whipple ........................ 251/145

1,817,258 8/1931 Klinger ........................... 251/171
3,260,498 7/1966 Johnson ......................... 251/189

Primary Examiner—Harold W. Weakley
Attorney—Spector & Alster

ABSTRACT: A valve of the type that may be installed in a pipeline without interruption of the service of the pipeline comprises a valve body having a bore that intersects the pipeline, a nonrotatable resilient seal in the bore, and a valve stem rotatable in the seal for opening and closing the valve. Structure is provided for compressing the seal axially so that it expands radially against the perimeter of the pipe openings to form seals thereat. Bearings are carried by the housing for taking the thrust that is exerted against the stem in a direction axially of the pipeline.

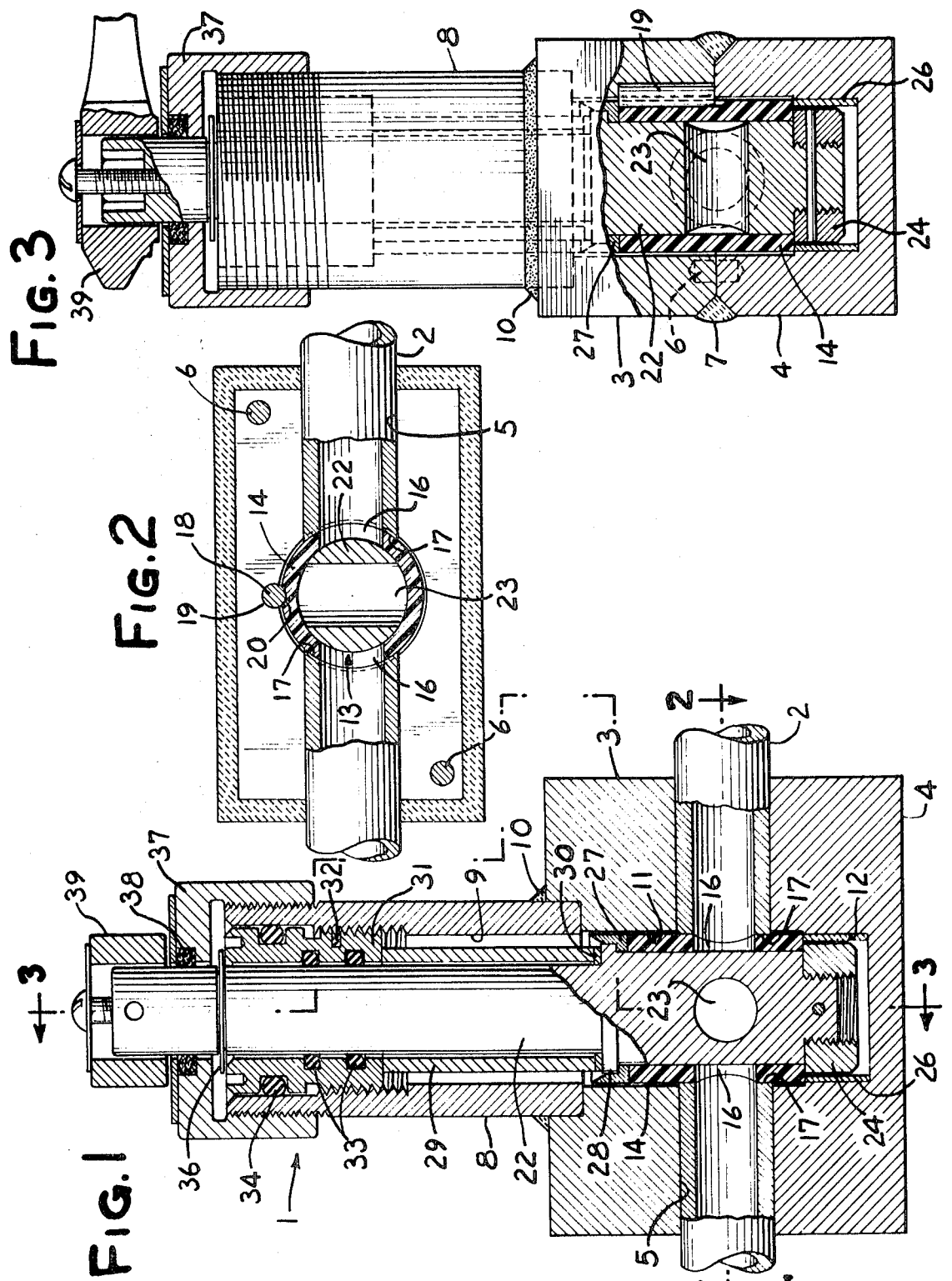

VALVE

This invention relates to improvement in valves of the type that may be installed in pipelines without interruption of service from the pipeline.

It is an object of this invention to provide a pipeline valve of a type that may be installed in an existing pipeline and wherein the opening that is cut into the pipeline for installation of the valve is sealed by a cylindrical sealing member that may be axially compressed and thereby radially expanded into engagement with the perimeter of the pipe at that opening to produce positive and effective valve sealing thereat.

It is a further object of this invention to provide a valve of the type stated that includes a valve body with a bore that intersects the pipe opening, which is within the valve body, and wherein the sealing member is a nonrotatable element that has ports coaxial with the pipeline. A valve stem is rotatable in the sealing member and is in sliding but sealing engagement therewith and is operable to open and close the valve. Bearings are interposed between the stem and the housing to take up the thrust that is exerted against the stem axially of the pipeline.

The attainment of the above and further objects of this invention will be apparent from the following detailed description taken in conjunction with the accompanying drawing forming a part thereof.

In the drawing:

FIG. 1 is a sectional view of a valve of the present invention taken along the axis of rotation of the valve stem;

FIG. 2 is a sectional view taken along line 2—2 of FIG. 1; and

FIG. 3 is an elevational view of the valve, but partly in a section that is viewed from line 3—3 of FIG. 2.

Referring now in more detail to the drawing, 1 designates a valve that is installed in a pipeline 2. The valve 1 has a valve body that includes two mating blocks 3, 4 which are located on and embrace the pipeline. The blocks 3, 4 may be aligned by dowel pins 6,6 and meet along faces which may lie in a plane that includes the central axis of the pipeline. When assembled the blocks 3,4 define a bore 5 for receiving the pipeline 2. To assure a fluid seal, the blocks 3,4 are welded together at their joint 7 completely therearound. The upper block 3 has a recess which receives a tube or bonnet 8 which is welded at 10 thereto fully around the periphery of the bonnet 8 to form a fluidtight seal with the block 3. The bonnet 8 has a bore 9 that is coaxial with a bore 11 in the upper block 3 and with a bore 12 in the lower block 4. The coaxial bores 11, 12 intersect at right angles to an opening or gap 13 the pipeline 2. This opening 13 is formed by cutting away a portion of the pipe 2 during the process of installing the valve in place. The cutter is of a type having a cutting diameter that is greater than the diameter of the pipe and cuts along a path perpendicular to the longitudinal axis of the pipe to form opposed perimetral pipe edges 17,17.

Within the bores 11,12 is a hollow valve seal 14 having opposed ports 16,16 in the cylindrical wall thereof which are presented to the opposed perimetral edges 17,17 and are substantially of the same diameter as that of the internal diameter of the pipe. The seal 14 is keyed against rotation in the cylindrical bores 11,12 by a pin 18 that is received in a slot 19 in the upper block 3 and in a peripheral groove 20 in the seal 14. The seal 14 is formed of a resilient plastic material, such as polytetrafluoroethylene resin, sold under the trademark "Teflon."

Rotatable within the seal 14 is a valve stem 22 having radial opening 23 therethrough that is preferably of the same diameter as that of the ports 16,16. The stem 22 is shown in the "valve closed" position, the valve being fully opened by rotating the stem 22 90° from the position shown to position the opening 23 coaxial with the pipeline. Threaded onto the lower end of the stem 22 is a bronze seal retainer 24 against which the lower axial end of the seal 14 is pressed. At the bottom of the bore 12 is a bronze bearing 26 in which the seal retainer 24 is journaled. At the upper axial end of the seal 14 and within the bore 11 is another bearing 27 that radially overlaps with a slightly diametrally enlarged portion 28 of the stem 22 and which is journaled therein. The bearings 26,27 take the thrust that is exerted against the valve stem 22 radially thereof, i.e., in a direction axially of the pipe.

The upper or diametrally reduced portion of the stem 22 extends into the bonnet 8 and is surrounded by a spacer 29. A thrust washer 30 may be interposed between the axial lower end of the spacer 29 and the adjacent part of the stem 22. Above the spacer 29 and bearing thereagainst is a stem gland 31 that is threaded into the bonnet 8 in surrounding relation with the stem 22. A plastic insert 32 may be used, in a known manner, to provide a seal between the external thread on the gland 31 and the internal thread on the bonnet 8. Furthermore, a suitable stem packing, which may consist of O-rings 33,33, forms a seal between the stem 22 and the stem gland 31. An O-ring 34 may form an additional seal between the unthreaded outer face of the gland 31 and the unthreaded inner adjacent surface of the bonnet 8.

The upper end portion of the stem 22 may be undercut to receive a stem gland retaining ring 36. A dust cover 37 is threaded onto the bonnet 8 and carries a dust seal 38 through which the upper end of the stem 22 projects. For rotation of the stem 22 an operating handle 39 may be screwed or otherwise suitably mounted onto the top of the stem 22 above the dust cover 37.

In the installation of the valve, the pin 18 is inserted into the slot 19 before assembly of the two blocks 3,4. The pin 18 remains in place since the slot 19 extends more than a half circle. The interior mechanism containing the stem 22, ring 36, gland 31, spacer 29, washer 30, bearing 17, seal 14, retainer 24, together with the O-rings and thread seal is preassembled and inserted into the bonnet 8 and bores 11, 12, aligning the seal groove 20 with the pin 18. The bearing 26 has been previously installed. The stem gland 31 is then turned down to apply axial pressure against the seal 14, which will be axially compressed between the retainer 14 and the bearing 27. As a result the cylindrical seal 14 is radially expanded so that the parts of the seal that are at the perimetral portions 17,17 of the pipe are forced into tight sealing engagement therewith, and with the ports 16,16 coaxial with the pipeline. At the same time the seal 14 is caused to expand radially inwardly to form a sliding but sealing engagement with the part of the outer surface of the valve stem 22 therewithin. The dust cover 37 and handle 39 may then be mounted in place.

In compliance with the requirements of the patent statutes, there is herein shown a preferred embodiment of the invention. This is merely illustrative of the principles of the invention. What is new and sought to be covered by Letters Patent is:

1. A valve in a pipeline, the valve having a valve body with a continuous first bore therethrough for receiving the pipeline, said valve body surrounding the pipeline, the valve body having a cylindrical second bore therein intersecting the first bore, the pipeline having an opening therein at said intersection, a valve seal in said second bore and extending thru said opening, said seal being closely confined within the second bore and being of resilient material that expands in a direction radially of said second bore when it is compressed in a direction axially of said second bore, and means for compressing said valve seal axially of said second bore to expand it radially of said second bore into sealing engagement with the perimeter of the pipeline at said opening.

2. A structure according to claim 1 in which the seal and second bore are cylindrical, and wherein there are means for keying said seal against rotation in the second bore, and means movable in said seal for opening and closing the valve.

3. A structure according to claim 1 including a wall on said seal, said wall having port means opening to said pipe line, and means including valve stem movable in said seal for opening and closing said port means.

4. A structure according to claim 3 in which the means for compressing the seal axially also expands the seal into slidable but sealing engagement with said valve stem.

5. A structure according to claim 3 wherein the seal and second bore are cylindrical, and wherein there are means for keying the seal against rotation in said second bore.

6. A pipeline valve comprising a valve body including two mating blocks adapted to be placed on a pipeline in position where together they embrace the pipeline, one of the blocks having a bore therethrough that intersects the pipeline, a bonnet sealed to and extending from said one block and surrounding said bore, the other block having a second bore therein coaxial with said first bore and said bonnet, a nonrotatable tubular valve seal extending from one of said bores into the other bore and having a port therethrough coaxial with the pipeline, means for opening and closing said port, said means comprising a rotatable valve stem extending through said bonnet and through said valve seal and rotatable in said valve seal, a stem gland extending into the bonnet, the valve stem extending through the gland, means forming a fluidtight seal between the gland and the stem and between the bonnet and the gland, means for compressing the valve seal to form a liquidtight seal with a pipe that is embraced by the valve body, and bearing means between the stem and the valve body for taking the thrust that is exerted against the stem in a direction axially of the pipeline.

7. A structure according to claim 6 in which the means for compressing the valve seal includes the stem gland and wherein the seal is urged into sliding but sealing engagement with the valve stem.